United States Patent
Burdzy et al.

(10) Patent No.: US 9,828,454 B2
(45) Date of Patent: Nov. 28, 2017

(54) SYNTHESIS OF FUNCTIONAL POLYISOBUTYLENE-CONTAINING OLIGOMERS AND POLYMERS

(71) Applicant: Henkel IP & Holding GmbH, Duesseldorf (DE)

(72) Inventors: Matthew Burdzy, South Windsor, CT (US); Dingsong Feng, Melrose, MA (US); Tianzhi Zhang, Skillman, NJ (US)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 14/806,237

(22) Filed: Jul. 22, 2015

(65) Prior Publication Data

US 2015/0337067 A1    Nov. 26, 2015

Related U.S. Application Data

(63) Continuation of application No. PCT/US2014/010053, filed on Jan. 2, 2014.

(60) Provisional application No. 61/757,353, filed on Jan. 28, 2013.

(51) Int. Cl.
| | | |
|---|---|---|
| *C08F 10/10* | (2006.01) | |
| *C08F 255/08* | (2006.01) | |
| *C08F 8/00* | (2006.01) | |

(52) U.S. Cl.
CPC .............. *C08F 255/08* (2013.01); *C08F 8/00* (2013.01); *C08F 2810/30* (2013.01); *C08F 2810/40* (2013.01)

(58) Field of Classification Search
CPC ................................ C08F 10/10; C08F 110/10
See application file for complete search history.

(56) References Cited

U.S. PATENT DOCUMENTS

| | | |
|---|---|---|
| 5,247,021 A | 9/1993 | Fujisawa et al. |
| 6,469,115 B1 | 10/2002 | Faust et al. |
| 7,579,412 B2 | 8/2009 | Lange et al. |
| 8,344,073 B2 | 1/2013 | Storey et al. |
| 9,512,247 B2 | 12/2016 | Ikari et al. |
| 2005/0143526 A1* | 6/2005 | Faust ........................ C08F 8/30 525/242 |
| 2006/0041084 A1 | 2/2006 | Stokes et al. |
| 2010/0184918 A1* | 7/2010 | Storey ................... C08F 110/10 525/106 |
| 2011/0306745 A1 | 12/2011 | Storey et al. |

FOREIGN PATENT DOCUMENTS

| | | |
|---|---|---|
| JP | H04183702 A | 6/1992 |
| JP | 2007502898 A | 2/2007 |
| JP | 2008510859 A | 4/2008 |
| WO | 9510544 A1 | 4/1995 |
| WO | 2004092227 A1 | 10/2004 |
| WO | 2008156806 A1 | 12/2008 |
| WO | 2010111280 A1 | 9/2010 |
| WO | 2011159468 A2 | 12/2011 |
| WO | 2013047314 A1 | 4/2013 |

OTHER PUBLICATIONS

International Search Report for International Application No. PCT/US2014/010053 dated May 20, 2014.
Feng et al., Facile synthesis of diphenylethylene end-functional polyisobutylene and its applications for the synthesis of block copolymers containing poly(methacrylate)s, Polymer, vol. 49, 2008, pp. 386-393.
Morgan et al., End-Quenching of TiCl4-Catalyzed Quasiliving Polyisobutylene with Alkoxybenzenes for Direct Chain End Functionalization, Macromolecules, vol. 43, 2010, pp. 8724-8740.
Hackethal et al., Introducing Polar Monomers into Polyisobutylene by Living Cationic Polymerization: Structural and Kinetic Effects, Macromolecules, vol. 43, 2010, pp. 1761-1770.
Keszler et al., Styryl-Telechelic Polyisobutylenes. I. Synthesis of Linear and Tri-Arm Star Styryl-Telechelic Polyisobutylenes, J. Macromol. Sci.-Chem., vol. A21(3), 1984, pp. 307-318.
Tripathy et al., Syntheses and Characterization of Polyisobutylene Macromonomers with Methacrylate, Acrylate, Glycidyl Ether, or Vinyl Ether End-Functionality, Macromolecules, vol. 42(12), 2009, pp. 3958-3964.

\* cited by examiner

*Primary Examiner* — Vu A Nguyen

(74) *Attorney, Agent, or Firm* — James E. Piotrowski

(57) ABSTRACT

Disclosed are single step and multi-step methods of making functional polyisobutylene (PIB)-containing oligomers and polymers and the materials made thereby. In the single step method a functional group containing PIB oligomer or polymer is made under cationic polymerization conditions in a direct, one step reaction. In the multi-step method a functional group containing PIB oligomer or polymer is made in a two-step process. The first step is performed under cationic polymerization conditions. The second step is performed under non-cationic polymerization conditions.

11 Claims, No Drawings

SYNTHESIS OF FUNCTIONAL POLYISOBUTYLENE-CONTAINING OLIGOMERS AND POLYMERS

FIELD

One aspect relates to single step methods of making functional polyisobutylene (PIB)-containing oligomers and polymers and the materials made thereby. Another aspect relates to multi-step methods of making functional polyisobutylene (PIB)-containing oligomers and polymers and the materials made thereby.

SUMMARY

One aspect of the disclosure provides functional polyisobutylene (PIB)-containing oligomers and polymers.

One aspect of the disclosure provides single step methods for making functional polyisobutylene (PIB)-containing oligomers and polymers.

One aspect of the disclosure provides multi-step methods for making functional polyisobutylene (PIB)-containing oligomers and polymers.

One aspect of the disclosure provides curable compositions including functional polyisobutylene (PIB)-containing oligomers and polymers and methods of using those curable compositions.

The disclosed compounds include any and all isomers and stereoisomers. In general, unless otherwise explicitly stated the disclosed materials and processes may be alternately formulated to comprise, consist of, or consist essentially of, any appropriate components, moieties or steps herein disclosed. The disclosed materials and processes may additionally, or alternatively, be formulated so as to be devoid, or substantially free, of any components, materials, ingredients, adjuvants, moieties, species and steps used in the prior art compositions or that are otherwise not necessary to the achievement of the function and/or objective of the present disclosure.

When the word "about" is used herein it is meant that the amount or condition it modifies can vary some beyond the stated amount so long as the function and/or objective of the disclosure are realized. The skilled artisan understands that there is seldom time to fully explore the extent of any area and expects that the disclosed result might extend, at least somewhat, beyond one or more of the disclosed limits. Later, having the benefit of this disclosure and understanding the concept and embodiments disclosed herein, a person of ordinary skill can, without inventive effort, explore beyond the disclosed limits and, when embodiments are found to be without any unexpected characteristics, those embodiments are within the meaning of the term about as used herein.

DETAILED DESCRIPTION

Unless defined otherwise, all technical and scientific terms used herein have the same meaning as is commonly understood by one of ordinary skill in the art. As used herein for each of the various embodiments, the following definitions apply.

"Alkyl" or "alkane" refers to a hydrocarbon chain or group containing only single bonds. The alkane can be a straight hydrocarbon chain or a branched hydrocarbon group. The alkane can be cyclic. The alkane can contain 1 to 20 carbon atoms, advantageously 1 to 10 carbon atoms and more advantageously 1 to 6 carbon atoms. In some embodiments the alkane can be substituted. Exemplary alkanes include methyl, ethyl, n-propyl, isopropyl, isobutyl, n-butyl, sec-butyl, tert-butyl, isopentyl, neopentyl, tert-pentyl, isohexyl and decyl.

"Alkenyl" or "alkene" refers to a hydrocarbon chain or group containing one or more double bonds. The alkenyl can be a straight hydrocarbon chain or a branched hydrocarbon group. The alkene can be cyclic. The alkene can contain 1 to 20 carbon atoms, advantageously 1 to 10 carbon atoms and more advantageously 1 to 6 carbon atoms. The alkene can be an allyl group. The alkene can contain one or more double bonds that are conjugated. In some embodiments the alkene can be substituted.

"Alkoxy" refers to the structure —OR, wherein R is hydrocarbyl.

"Alkyne" or "alkynyl" refers to a hydrocarbon chain or group containing one or more triple bonds. The alkyne can be a straight hydrocarbon chain or a branched hydrocarbon group. The alkyne can be cyclic. The alkyne can contain 1 to 20 carbon atoms, advantageously 1 to 10 carbon atoms and more advantageously 1 to 6 carbon atoms. The alkyne can contain one or more triple bonds that are conjugated. In some embodiments the alkyne can be substituted.

"Aryl" or "Ar" refers to a monocyclic or multicyclic aromatic group. The cyclic rings can be linked by a bond or fused. The aryl can contain from 6 to about 30 carbon atoms; advantageously 6 to 12 carbon atoms and in some embodiments 6 carbon atoms. Exemplary aryls include phenyl, biphenyl and naphthyl. In some embodiments the aryl is substituted.

"Cationic polymerization" refers to polymerization of a monomer using a carbocationic initiator; a coinitiator such as a Lewis Acid, for example $TiCl_4$; and a cationically polymerizable monomer. The reaction is typically performed in a solvent or mixture of solvents at low temperature (for example less than 0° C.) and substantially excluding moisture.

"Ester" refers to the structure R—C(O)—O—R' where R and R' are independently selected hydrocarbyl groups. The hydrocarbyl groups can be substituted or unsubstituted.

"Halogen" or "halide" refers to an atom selected from fluorine, chlorine, bromine and iodine.

"Hetero" refers to one or more heteroatoms in a structure. Exemplary heteroatoms are independently selected from N, O and S.

"Heteroaryl" refers to a monocyclic or multicyclic aromatic ring system wherein one or more ring atoms in the structure are heteroatoms. Exemplary heteroatoms are independently selected from N, O and S. The cyclic rings can be linked by a bond or fused. The heteroaryl can contain from 5 to about 30 carbon atoms; advantageously 5 to 12 carbon atoms and in some embodiments 5 to 6 carbon atoms. Exemplary heteroaryls include furyl, imidazolyl, pyrimidinyl, tetrazolyl, thienyl, pyridyl, pyrrolyl, thiazolyl, isothiazolyl, oxazolyl, isoxazolyl, thiazolyl, quinolinyl and isoquinolinyl. In some embodiments the heteroaryl is substituted.

"Hydrocarbyl" refers to a group containing carbon and hydrogen atoms. The hydrocarbyl can be linear, branched, or cyclic group. The hydrocarbyl can be alkyl, alkenyl, alkynyl or aryl. In some embodiments, the hydrocarbyl is substituted.

"Lewis acid" refers to a chemical entity that is capable of accepting a pair of electrons.

"(Meth)acrylate" refers to acrylate and methacrylate.

"Oligomer" refers to a defined, small number of repeating monomer units such as 10-5,000 units, and advantageously 10-1,000 units which have been polymerized to form a molecule. Oligomers are a subset of the term polymer.

"One step reaction" refers to a chemical reaction to form a functionalized PIB containing oligomer or polymer wherein polymerization of isobutylene or an isobutylene containing monomer mixture and functionalization of the resulting oligomer or polymer is performed in the same reaction vessel and under cationic polymerization reaction conditions.

"Polyaromatic hydrocarbon" or "PAr" or "polycyclic aromatic hydrocarbon" refers to a fused, multicyclic aromatic group for example containing 2 to 20 ring moieties. The polyaromatic hydrocarbon can contain from 6 to about 120 ring carbon atoms; advantageously 6 to 20 ring carbon atoms. In some embodiments the polyaromatic hydrocarbon contains heteroatoms as ring atoms. Exemplary polyaromatic hydrocarbons include naphthalene, anthracene, phenanthrene and fluorene. In some embodiments the aryl is substituted.

"Polymer" refers to any polymerized product greater in chain length and molecular weight than the oligomer. Polymers can have a degree of polymerization of about 50 to about 25000. As used herein polymer includes oligomers and polymers. As used herein polymer includes homopolymers and copolymers.

"Substituted" refers to the presence of one or more substituents on a molecule in any possible position. Useful substituents are those groups that do not significantly diminish the disclosed reaction schemes. Exemplary substituents include, for example, H, halogen, (meth)acrylate, epoxy, oxetane, urea, urethane, $N_3$, NCS, CN, NCO, $NO_2$, $NX^1X^2$, $OX^1$, $C(X^1)_3$, $C(halogen)_3$, $COOX^1$, $SX^1$, $Si(OX^1)_iX^2_{3-i}$, alkyl, alcohol, alkoxy; wherein $X^1$ and $X^2$ each independently comprise H, alkyl, alkenyl, alkynyl or aryl and i is an integer from 0 to 3.

One aspect of this disclosure provides a method of making a functional group containing PIB oligomer or polymer under cationic polymerization conditions in a direct, one step reaction. This method does not include or require any post-polymerization reactions performed under non-cationic polymerization conditions. Methods of making functional PIB polymers that use non-cationic post-polymerization reactions are not encompassed by the method of this aspect. The method of this aspect reacts an initiator with isobutylene under cationic polymerization conditions to provide an intermediate that is reacted with a capping agent, also under cationic polymerization conditions, to provide the functional group containing PIB oligomer or polymer.

The disclosed process uses a capping reaction performed under cationic polymerization conditions to introduce the desired functional group into the PIB oligomer or polymer. Since a living PIB center is a cation bearer, a direct electrophilic aromatic substitution (EAS) reaction can be utilized as the capping reaction. Electro-donating groups will facilitate the EAS reaction. Therefore the disclosed process uses three specific families as a capping reagent.

Functional groups useful in this process can be any chemical moiety that will not interfered with the capping reaction. Some exemplary functional groups include (meth)acrylate, OH, epoxy, oxetane, cyanate, isocyanate, urethane, urea, $NR^5R^6$, $SR^7$, $Si(OR^8)R^9_{3-i}$; where i is an integer from 0 to 3 and $R^5$, $R^6$, $R^7$, $R^8$, $R^9$ can be independently selected from H, alkyl, heteroalkyl, alkenyl, heteroalkenyl, alkynyl, heteroalkynyl, aryl, heteroaryl. The functional groups can be either terminal or pendant on the PIB containing oligomer or polymer.

The initiator may contain one or more initiation sites (for example from 1 initiation site to about 20 initiation sites). The number of initiation sites can be varied to generate different PIB polymer structures, for example mono functional structures, di-functional structures or star structures.

A bi-functional initiator can be used to prepare PIB-containing oligomer or polymers with a plurality of the same or different functional groups. With the bi-functional initiator comprising a desired functional group, a coupling reaction of living PIB having an aromatic structure can be used to produce PIB-containing oligomer or polymer with two or more functional groups. In this coupling reaction there is no electron donating group in the aromatic structure, however once one PIB arm is connected, the electron donor will facilitate the coupling reaction.

The PIB-containing oligomer or polymer can be a co-polymer comprising styrene, isoprene or other monomer segments, polymerized by the one step cationic polymerization mechanism. The weight percentage of co-monomer can range from about 1 to about 30% by weight of PIB-containing oligomer or polymer.

Another aspect of this disclosure provides a method of making a functional group containing PIB oligomer or polymer under cationic polymerization conditions in a direct, one step reaction. This method does not include or require any post-polymerization reactions performed under non-cationic polymerization conditions. Methods of making functional PIB polymers that use non-cationic post-polymerization reactions are not encompassed by the method of this aspect. The method of this aspect reacts an initiator with isobutylene under cationic polymerization conditions to provide an intermediate that can be reacted with a coupler, also under cationic polymerization conditions. The product can be capped under cationic polymerization conditions to add a functional group to provide the functional group containing PIB oligomer or polymer.

Advantageously, the method of this aspect reacts a functional group containing initiator with isobutylene and/or other cationically polymerizable materials under cationic polymerization conditions to provide an intermediate that is reacted with a coupler, also under cationic polymerization conditions, to provide the functional group containing PIB oligomer or polymer.

Functional groups useful in this process can be any chemical moiety that will not interfere with the reaction. Some exemplary functional groups include (meth)acrylate, acrylic isocyanate, OH, epoxy, oxetane, cyanate, isocyanate, silane, chlorosilane, urea, $NR^5R^6$, $SR^7$, $Si(OR^8)_iR^9_{3-i}$; where i is an integer from 0 to 3 and $R^5$, $R^6$, $R^7$, $R^8$, $R^9$ can be independently selected from H, halogen, alkyl, heteroalkyl, alkenyl, heteroalkenyl, alkynyl, heteroalkynyl, aryl, heteroaryl. The functional groups can be either terminal or pendant on the PIB containing oligomer or polymer The initiator may contain one or more initiation sites (for example from 1 initiation site to about 20 initiation sites). The number of initiation sites can be varied to generate different PIB polymer structures, for example mono functional structures, di-functional structures or star structures.

A bi-functional initiator can be used to prepare PIB-containing oligomer or polymers with a plurality of the same or different functional groups. With the bi-functional initiator comprising a desired functional group, a coupling reaction of living PIB having an aromatic structure can be used to produce PIB-containing oligomer or polymer with two or more functional groups. In this coupling reaction there is no electron donating group in the aromatic structure, however once one PIB arm is connected, the electron donor will facilitate the coupling reaction.

Another aspect of this disclosure provides a method of making a functional group containing PIB oligomer or polymer in a two step process. The first step is performed under cationic polymerization conditions. The second step is performed under non-cationic polymerization conditions.

One Step Direct Capping Reaction Scheme:

A direct capping method of preparing a PIB oligomer or polymer in a one step reaction is shown below.

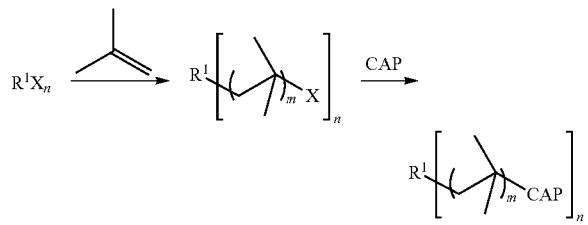

where:

$R^1$ is an initiator core structure. $R^1$ can be independently selected from alkyl, heteroalkyl, aryl, heteroaryl, alkenyl, heteroalkenyl, alkynyl, heteroalkynyl and alkoxy; $R^1$ can be substituted or unsubstituted.

X is an initiating site bonded to the initiator core structure. X can be independently selected from halide, alkoxy, and ester;

m is an integer from about 2 to about 1,000;

n is an integer from about 1 to about 20;

is isobutylene;

CAP is a capping reagent selected from one or more of following structures I to III;

I Ar-(EDG-$R^2$—Y)$_q$
II (Ar)$_p$—Ar-(EDG-$R^2$—Y)$_q$
III PAr-(EDG-$R^2$—Y)$_q$ where EDG is an electron donating group. EDG can include O, $NR^3$, S, $R^4$. Advantageously, EDG for capping reagent I is selected from $NR^3$, S, $R^4$.

$R^2$ can be independently selected from H, alkyl, heteroalkyl, alkenyl, heteroalkenyl, alkynyl, heteroalkynyl, aryl, heteroaryl;

$R^3$ can be independently selected from H, alkyl, heteroalkyl, alkenyl, heteroalkenyl, alkynyl, heteroalkynyl, aryl, heteroaryl;

$R^4$ can be independently selected from H, alkyl, heteroalkyl, alkenyl, heteroalkenyl, alkynyl, heteroalkynyl, aryl, heteroaryl;

p is an integer from about 1 to about 20;

q is an integer from about 1 to about 20;

Y can be independently selected from (meth)acrylate, OH, epoxy, oxetane, cyanate, isocyanate, urethane, urea, $NR^5R^6$, $SR^7$, $Si(OR^8)_iR^9_{3-i}$, where i is an integer from 0 to 3 and $R^5$, $R^6$, $R^7$, $R^8$, $R^9$ can each be independently selected from H, alkyl, heteroalkyl, alkenyl, heteroalkenyl, alkynyl, heteroalkynyl, aryl, heteroaryl;

One example of capping reagent I is shown in the following structure.

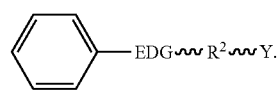

One example of capping reagent II is shown in the following structure.

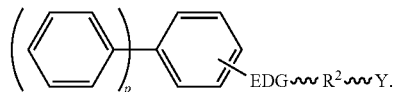

One example of capping reagent III is shown in the following structure.

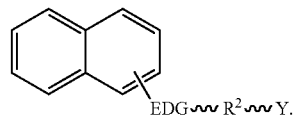

One Step Coupling Reaction Scheme:

A coupling reaction method of preparing a PIB polymer in a one step reaction is shown below.

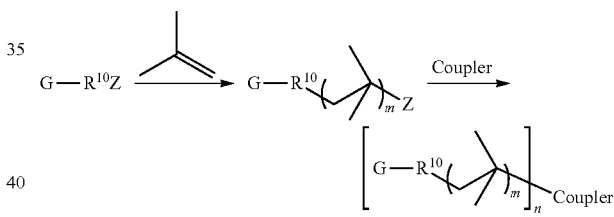

$R^{10}$ is an initiator core structure. $R^{10}$ can be independently selected from alkyl, heteroalkyl, alkenyl, heteroalkenyl, alkynyl, heteroalkynyl, alkoxy, aryl, heteroaryl;

G is a functional moiety bonded to the initiator structure. G can be independently selected from (meth)acrylate, OH, epoxy, oxetane, cyanate, isocyanate, urethane, urea, $NR^{11}R^{12}$, $SR^{13}$, $Si(OR^{14})_iR^{15}_{3-i}$, where i is an integer from 0 to 3 and $R^{11}$, $R^{12}$, $R^{13}$, $R^{14}$, $R^{15}$ can be independently selected from H, alkyl, heteroalkyl, alkenyl, heteroalkenyl, alkynyl, heteroalkynyl, aryl, heteroaryl;

Z is an initiating site bonded to the initiator structure. Z can be independently selected from halide, alkoxy, ester;

m is an integer from about 2 to about 1,000;

n is an integer from about 1 to about 20;

Coupler is selected from aryl, substituted aryl, heteroaryl and substituted heteroaryl. Exemplary couplers include benzene, anisole, substituted aniline, and polyaromatic hydrocarbon.

Two Step Reaction Scheme:

A method of preparing a PIB polymer in a two step reaction is shown below. The first step is performed under cationic reaction conditions. The second step is performed under non-cationic reaction conditions.

Step 1: Cationic Reaction Conditions

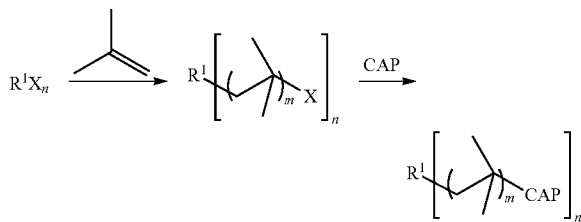

Step 2: Non-Cationic Reaction Conditions

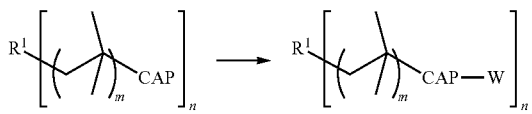

where:

$R^1$ is an initiator core structure; $R^1$ can be independently selected from alkyl, heteroalkyl, aryl, heteroaryl, alkenyl, heteroalkenyl, alkynyl, heteroalkynyl and alkoxy; $R^1$ can be substituted or unsubstituted;

X is an initiating site bonded to the initiator core structure; X can be independently selected from halide, alkoxy, and ester;

m is an integer from about 2 to about 1,000;

n is an integer from about 1 to about 20;

CAP is a capping reagent selected from one or more of following structures I to III;

I Ar-(EDG-R$^2$—Y)$_q$.

II (Ar)$_p$—Ar-(EDG-R$^2$—Y)$_q$

III PAr-(EDG-R$^2$—Y)$_q$ where EDG is an electron donating group. EDG can include O, NR$^3$, S, R$^4$. EDG for capping reagent I is selected from NR$^3$, S, R$^4$ and excludes O;

$R^2$ can be independently selected from H, alkyl, heteroalkyl, alkenyl, heteroalkenyl, alkynyl, heteroalkynyl, aryl, heteroaryl;

$R^3$ can be independently selected from H, alkyl, heteroalkyl, alkenyl, heteroalkenyl, alkynyl, heteroalkynyl, aryl, heteroaryl;

$R^4$ can be independently selected from H, alkyl, heteroalkyl, alkenyl, heteroalkenyl, alkynyl, heteroalkynyl, aryl, heteroaryl;

p is an integer from about 1 to about 20;

q is an integer from about 1 to about 20;

each Y can be independently selected from (meth)acrylate, OH, epoxy, oxetane, cyanate, isocyanate, urethane, urea, NR$^5$R$^6$, SR$^7$, Si(OR$^8$)$_i$R$^9_{3-i}$, where i is an integer from 0 to 3 and R$^5$, R$^6$, R$^7$, R$^8$, R$^9$ can be independently selected from H, alkyl, heteroalkyl, alkenyl, heteroalkenyl, alkynyl, heteroalkynyl, aryl, heteroaryl;

each W can be independently selected from alkyl, heteroalkyl, alkenyl, heteroalkenyl, alkynyl, heteroalkynyl, aryl, heteroaryl.

The functionalized PIB containing polymers and oligomers can be used as one component of a curable composition. Other components of the curable composition include one or more of a co-monomer, catalyst, filler, antioxidant, reaction modifier, adhesion promoter, rheology modifier.

Co-Monomer

The curable composition can optionally include a co-monomer. Useable co-monomers include polymerizable materials other than the PIB functionalized oligomer or polymer.

Catalyst

The curable composition can include a catalyst to modify speed of the initiated reaction.

Filler

The curable composition can optionally include a filler. Some useful fillers include, for example, lithopone, zirconium silicate, hydroxides, such as hydroxides of calcium, aluminum, magnesium, iron and the like, diatomaceous earth, carbonates, such as sodium, potassium, calcium, and magnesium carbonates, oxides, such as zinc, magnesium, chromic, cerium, zirconium and aluminum oxides, calcium clay, fumed silicas, treated silicas, precipitated silicas, untreated silicas, graphite, synthetic fibers and mixtures thereof. When used filler can be employed in concentrations effective to provide desired physical properties in the uncured composition and cured reaction products and typically in concentrations of about 0.1% to about 70% by weight of composition.

Antioxidant

The curable composition can optionally include an antioxidant. Some useful antioxidants include those available commercially from Ciba Specialty Chemicals under the tradename IRGANOX. When used, the antioxidant should be used in the range of about 0.1 to about 15 weight percent of curable composition, such as about 0.3 to about 1 weight percent of curable composition.

Reaction Modifier.

The curable composition can include a reaction modifier. A reaction modifier is a material that will increase or decrease reaction rate of the curable elastomeric sealant composition. For example, quinones, such as hydroquinone, monomethyl ether hydroquinone (MEHQ), napthoquinone and anthraquinone, may also be included to scavenge free radicals in the curable elastomeric sealant composition and thereby slow reaction of that composition and extend shelf life. When used, the reaction modifier can be used in the range of about 0.1 to about 15 weight percent of curable composition.

Adhesion Promoter.

The curable composition can include one or more adhesion promoters that are compatible and known in the art. Examples of useful commercially available adhesion promoters include octyl trimethoxysilane (commercially available from Chemtura under the trade designation A-137), glycidyl trimethoxysilane (commercially available from Chemtura under the trade designation A-187), methacryloxypropyl trimethoxysilane (commercially available from Chemtura under the trade designation of A-174), vinyl trimethoxysilane, tetraethoxysilane and its partial condensation products, and combinations thereof. When used, the adhesion promoter can be used in the range of about 0.1 to about 15 weight percent of curable composition.

Rheology Modifiers.

The curable composition can optionally include a thixotropic agent to modify rheological properties of the uncured composition. Some useful thixotropic agents include, for example, silicas, such as fused or fumed silicas, that may be untreated or treated so as to alter the chemical nature of their surface. Virtually any reinforcing fused, precipitated or fumed silica may be used.

Examples of treated fumed silicas include polydimethylsiloxane-treated silicas and hexamethyldisilazane-treated silicas. Such treated silicas are commercially available, such as from Cabot Corporation under the tradename CAB-O-SIL ND-TS and Degussa Corporation under the tradename AEROSIL, such as AEROSIL R805.

Examples of untreated silicas include commercially available amorphous silicas such as AEROSIL 300, AEROSIL 200 and AEROSIL 130. Commercially available hydrous silicas include NIPSIL E150 and NIPSIL E200A manufactured by Japan Silica Kogya Inc.

When used rheology modifier can be employed in concentrations effective to provide desired physical properties in the uncured composition and cured reaction products and typically in concentrations of about 0.1% to about 70% by weight of composition.

The curable elastomeric sealant composition can optionally include other conventional additives at known concentrations effective to provide expected properties so long as they do not inhibit the desirable properties such as curing mechanism, elongation, low temperature sealing force, tensile strength, chemical resistance. Example of such optional additives include, for example, reinforcing materials such as fibers, diluents, reactive diluents, coloring agents and pigments, moisture scavengers such as methyltrimethoxysilane and vinyltrimethyloxysilane and the like may be included.

Exemplary Composition Ranges

A curable composition can typically comprise:
about 10 to 95 wt % of a functional group containing PIB oligomer or polymer;
about 0 to 80 wt % co-monomer;
about 0 to 20 wt % cross-linking agent;
about 0 to 20 wt % of a catalyst;
about 0 to 70 wt % of a filler;
about 0 to 15 wt % of an antioxidant;
about 0 to 15 wt % of a reaction modifier;
about 0 to 15 wt % of adhesion promoter;
about 0 to 70 wt % of rheology modifier;
about 0 to 10 wt % of other conventional additives.

Specific physical properties required for the uncured, composition will depend on application. For example, uncured composition viscosity can be formulated for application method and desired cycle time.

Specific physical properties required for cured reaction products of the composition will depend on sealing application, minimum and maximum operating temperatures within the application, desired tensile strength at high temperatures and desired sealing force at low temperatures.

Components to be sealed by the disclosed curable compositions have a first predetermined sealing surface that is aligned with a second predetermined sealing surface. Typically, the aligned sealing surfaces are in a fixed relationship and move very little relative to each other. The aligned sealing surfaces are generally in fluid communication with a chamber. The seal formed between the aligned sealing surfaces prevents movement of materials between the surfaces and into, or out of, the chamber.

One or both of the sealing surfaces can be machined or formed. The predetermined sealing surfaces are designed to allow a curable composition to be disposed on one or both surfaces during initial assembly of the component to form a seal therebetween. Design of the predetermined sealing surfaces enhances parameters such as alignment of the surfaces, contact area of the surfaces, surface finish of the surfaces, "fit" of the surfaces and separation of the surfaces to achieve a predetermined sealing effect. A predetermined sealing surface does not encompass surfaces that were not identified or designed prior to initial assembly to accommodate a seal or gasket, for example the outside surface of a component over which a repair material is molded or applied to lessen leaking. Sealing surfaces on an engine block and oil pan or an engine block and engine intake manifold are examples of sealing surfaces in fixed relationship.

The disclosed curable compositions can be in a flowable state for disposition onto at least a portion of one sealing surface to form a seal between the surfaces when they are aligned. The curable composition can be applied as a film over the sealing surface. The curable composition can also be applied as a bead in precise patterns by tracing, screen printing, robotic application and the like. In bead applications the disclosed compositions are typically dispensed as a liquid or semi-solid under pressure through a nozzle and onto the component sealing surface. The nozzle size is chosen to provide a line or bead of composition having a desired width, height, shape and volume. The curable composition can be contained in a small tube and dispensed by squeezing the tube; contained in a cartridge and dispensed by longitudinal movement of a cartridge sealing member; or contained in a larger container such as a 5 gallon pail or 55 gallon drum and dispensed at the point of use by conventional automated dispensing equipment. Container size can be chosen to suit the end use application.

The curable composition can be used to form a formed in place gasket (FIPG). In this application the composition is dispensed onto a first predetermined sealing surface. The first predetermined sealing surface and dispensed composition is aligned and sealingly engaged with a second predetermined sealing surface before the composition has fully cured. The composition will adhere to both sealing surfaces as it cures.

The curable composition can be used to form a cured in place gasket (CIPG). In this application the composition is dispensed onto a first predetermined sealing surface and allowed to substantially cure before contact with a second predetermined sealing surface. The first sealing surface and cured composition is sealingly engaged with the second sealing surface thereby compressing the cured composition to provide a seal between the sealing surfaces. The composition will adhere to only the first sealing surface.

The curable composition can be used to form a mold in place gasket (MIPG). In this application the part comprising the first predetermined sealing surface is placed in a mold. The composition is dispensed into the mold where it contacts the first sealing surface. The composition is typically allowed to cure before removal from the mold. After molding, the first sealing surface and molded composition is sealingly engaged with a second predetermined sealing surface thereby compressing the cured composition to provide a seal between the sealing surfaces. The composition will adhere to only the first sealing surface.

The curable composition can be used in liquid injection molding (LIM). In this application uncured composition is dispensed into a mold without any predetermined sealing surface under controlled pressure and temperature. The composition is typically allowed to cure before removal from the mold. After removal the molded part will retain its shape. In sealing applications the molded gasket is disposed between two predetermined sealing surfaces and compressed to provide a seal between the sealing surfaces.

The following examples are included for purposes of illustration so that the disclosure may be more readily understood and are in no way intended to limit the scope of the disclosure unless otherwise specifically indicated.

Prophetic Example 1
IB is isobutylene, CP grade, available from Sigma.
m-DCC is meta dicumyl chloride. U.S. Pat. No. 7,109,387 discloses methods of making m-DCC.
2,6 Lutidine is chemical grade available from Sigma.
Methyl chloride is CP grade, available from Sigma.
n-hexane is CP grade available from EMD chemicals.
Phenoxy n-butylacrylate can be prepared by esterification of 4-phenoxy-1-butanol with acryloyl chloride in the presence of triethylamine. 4-phenoxy-1-butanol can be prepared according to procedure described in *Macromolecules,* 43 (21), 8724.

Reaction: Isobutylene (IB) polymerization can be carried out at −80° C. under a dry nitrogen atmosphere in an mBraun glove box using [IB]=5.1 M; [m-DCC]=33 mM and [Lutidine]=10 mM using methylchloride/hexane (38/62 wt/wt) mixture. TiCl4 (=15 mM) can be added to start polymerization. After 30 min polymerization, another portion of TiCl4 (=15 mM) can be added and the reaction can be allowed to proceed for about 3 hours (in-situ ReactIR can be used to monitor the conversion of IB to ensure complete conversion). When substantially full conversion of IB is confirmed by ReactIR, more polar solvent methylchloride can be added to adjust the methylchloride/hexane ratio (69/31 wt/wt). Subsequently the capping agent phenoxybutyl acrylate (132 mM, compared 33 mM m-DCC) can be added while stirring. A third portion of TiCl4 (=90 mM) can be added to speed the capping reaction. The capping reaction can be allowed to proceed at −80° C. for about 2 hours.

Post reaction work-up: The reaction mixture can be stripped using conventional methods to remove methylchloride and then quenched with 5% wt aqueous NaOH solution. The organic layer can be washed with water twice and with methanol twice. The polymer solution can be stripped using conventional methods to remove hexane.

While preferred embodiments have been set forth for purposes of illustration, the foregoing description should not be deemed a limitation of the disclosure herein. Accordingly, various modifications, adaptations and alternatives may occur to one skilled in the art without departing from the spirit and scope of the present disclosure.

What is claimed:

1. A direct capping method of preparing a PIB oligomer or polymer in a one step reaction, comprising reacting components as shown below:

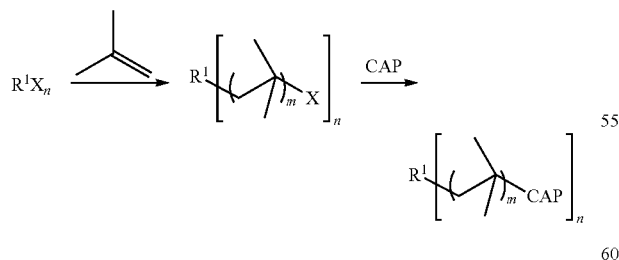

where:
R$^1$ is an initiator core structure independently selected from alkyl, heteroalkyl, aryl, heteroaryl, alkenyl, heteroalkenyl, alkynyl, heteroalkynyl and alkoxy and R$^1$ can be substituted or unsubstituted;
X is an initiating site bonded to the initiator core structure independently selected from halide, alkoxy, and ester;
m is an integer from about 2 to about 1,000;
n is an integer from about 1 to about 20;
CAP is a capping reagent selected from structure I;
  I Ar-(EDG-R$^2$—Y)$_q$
where EDG is an electron donating group selected from NR$^3$, S, and R$^4$;
R$^2$ can be independently selected from alkylene, heteroalkylene, alkenylene, heteroalkenylene, alkynylene, heteroalkynylene, arylene and heteroarylene;
R$^3$ can be independently selected from H, alkyl, heteroalkyl, alkenyl, heteroalkenyl, alkynyl, heteroalkynyl, aryl, and heteroaryl;
R$^4$ can be independently selected from alkylene, heteroalkylene, alkenylene, heteroalkenylene, alkynylene, heteroalkynylene, arylene and heteroarylene;
q is an integer from about 1 to about 20; and
Y can be independently selected from (meth)acrylate, OH, epoxy, oxetane, cyanate, isocyanate, urethane, urea, NR$^5$R$^6$, SR$^7$, and Si(OR$^8$)$_i$R$^9_{3-i}$, where i is an integer from 0 to 3 and R$^5$, R$^6$, R$^7$, R$^8$, R$^9$ can be independently selected from H, alkyl, heteroalkyl, alkenyl, heteroalkenyl, alkynyl, heteroalkynyl, aryl, and heteroaryl; or
from one or more of following structures II to III;
  II (Ar)$_p$-Ar-(EDG-R$^2$—Y)$_q$
  III PAr-(EDG-R$^2$—Y)$_q$
where EDG is an electron donating group selected from O, NR$^3$, S, and R$^4$;
R$^2$ can be independently selected from alkylene, heteroalkylene, alkenylene, heteroalkenylene, alkynylene, heteroalkynylene, arylene and heteroarylene;
R$^3$ can be independently selected from H, alkyl, heteroalkyl, alkenyl, heteroalkenyl, alkynyl, heteroalkynyl, aryl, and heteroaryl;
R$^4$ can be independently selected from alkylene, heteroalkylene, alkenylene, heteroalkenylene, alkynylene, heteroalkynylene, arylene and heteroarylene;
p is an integer from about 1 to about 20;
q is an integer from about 1 to about 20; and
Y can be independently selected from (meth)acrylate, OH, epoxy, oxetane, cyanate, isocyanate, urethane, urea, NR$^5$R$^6$, SR$^7$, and Si(OR$^8$)$_i$R$^9_{3-i}$, where i is an integer from 0 to 3 and R$^5$, R$^6$, R$^7$, R$^8$, R$^9$ can be independently selected from H, alkyl, heteroalkyl, alkenyl, heteroalkenyl, alkynyl, heteroalkynyl, aryl, and heteroaryl.

2. The method of claim 1 wherein EDG for capping reagent I is selected from NR$^3$, S, and R$^4$.

3. The method of claim 1 wherein CAP is shown in the following structure

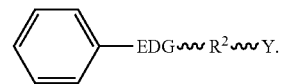

4. The method of claim 1 wherein CAP is shown in the following structure

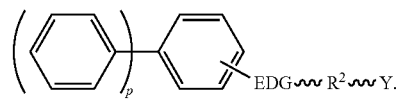

5. The method of claim 1 wherein CAP is shown in the following structure

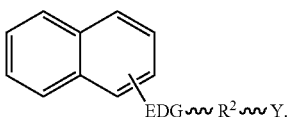

6. A curable composition comprising the functionalized PIB containing oligomer or polymer of claim 1 and optionally further comprising one or more of a co-monomer, catalyst, filler, antioxidant, reaction modifier, adhesion promoter, rheology modifier.

7. A cured reaction product of a curable composition comprising the functionalized PIB containing oligomer or polymer of claim 1.

8. A method of preparing a PIB polymer in a two step reaction, comprising
reacting components in step 1 under cationic reaction conditions as shown below,

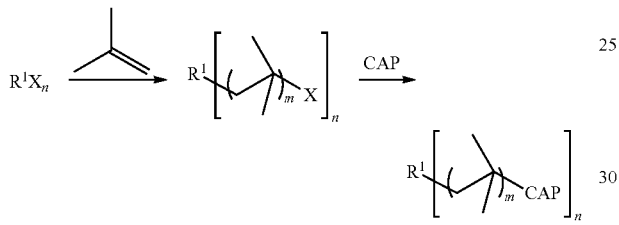

reacting components in step 2 under non-cationic reaction conditions as shown below,

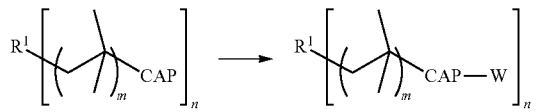

where:
$R^1$ is an initiator core structure selected from alkyl, heteroalkyl, aryl, heteroaryl, alkenyl, heteroalkeny, alkynyl, heteroalkynyl and alkoxy and $R^1$ can be substituted or unsubstituted;

X is an initiating site bonded to the initiator core structure and X can be selected from halide, alkoxy, and ester;
m is an integer from about 2 to about 1,000;
n is an integer from about 1 to about 20;
CAP is a capping reagent selected from one or more of following structures I to III;
I Ar-(EDG-$R^2$—Y)$_q$.
II (Ar)$_p$-Ar-(EDG-$R^2$—Y)$_q$
III PAr-(EDG-$R^2$—Y)$_q$
where EDG is an electron donating group selected from O, $NR^3$, S, and $R^4$ with the proviso that EDG for capping reagent I is selected from $NR^3$, S, $R^4$ and excludes O;
$R^2$ can be independently selected from alkylene, heteroalkylene, alkenylene, heteroalkenylene, alkynylene, heteroalkynylene, arylene and heteroarylene;
$R^3$ can be independently selected from H, alkyl, heteroalkyl, alkenyl, heteroalkenyl, alkynyl, heteroalkynyl, aryl, and heteroaryl;
$R^4$ can be independently selected from alkylene, heteroalkylene, alkenylene, heteroalkenylene, alkynylene, heteroalkynylene, arylene and heteroarylene;
p is an integer from about 1 to about 20;
q is an integer from about 1 to about 20;
each Y can be independently selected from (meth) acrylate, OH, epoxy, oxetane, cyanate, isocyanate, urethane, urea, $NR^5R^6$, $SR^7$, and $Si(OR^8)_iR^9_{3-i}$, where i is an integer from 0 to 3 and $R^5$, $R^6$, $R^7$, $R^8$, $R^9$ can be independently selected from H, alkyl, heteroalkyl, alkenyl, heteroalkenyl, alkynyl, heteroalkynyl, aryl, and heteroaryl;
each W can be independently selected from alkyl, heteroalkyl, alkenyl, heteroalkenyl, alkynyl, heteroalkynyl, aryl, and heteroaryl.

9. A curable composition comprising the functionalized PIB containing oligomer or polymer of claim 8 and optionally further comprising one or more of a co-monomer, catalyst, filler, antioxidant, reaction modifier, adhesion promoter, rheology modifier.

10. A cured reaction product of a curable composition comprising the functionalized PIB containing oligomer or polymer of claim 8.

11. The method of claim 1 wherein CAP is a capping reagent selected from structure II or III.

* * * * *